Sept. 8, 1953　　　H. S. BEATTIE　　　2,651,396
ELECTROMAGNETIC CLUTCH WITH LUBRICATING MEANS
Filed Aug. 25, 1949
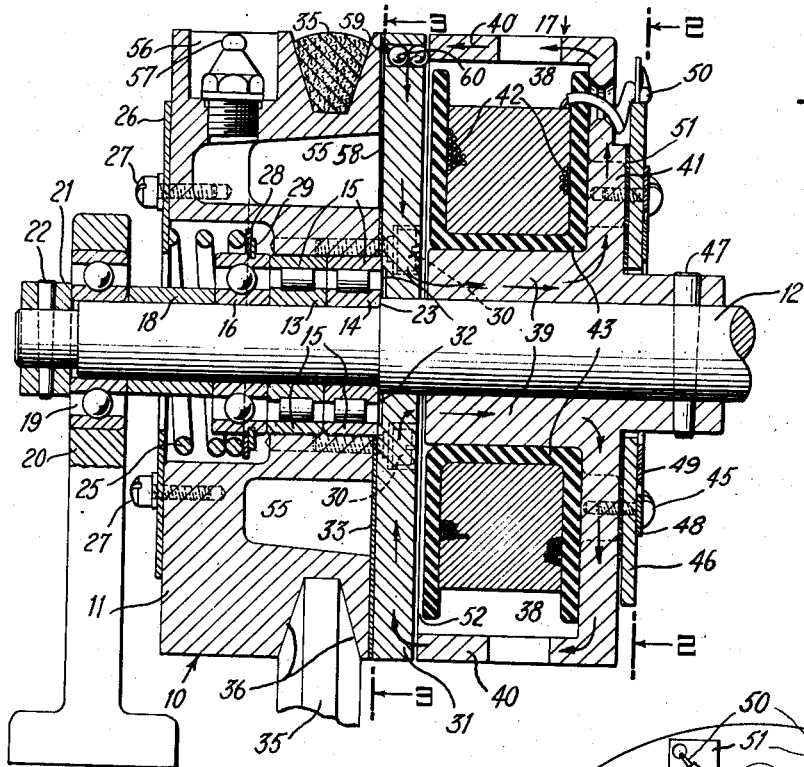
Fig.1.
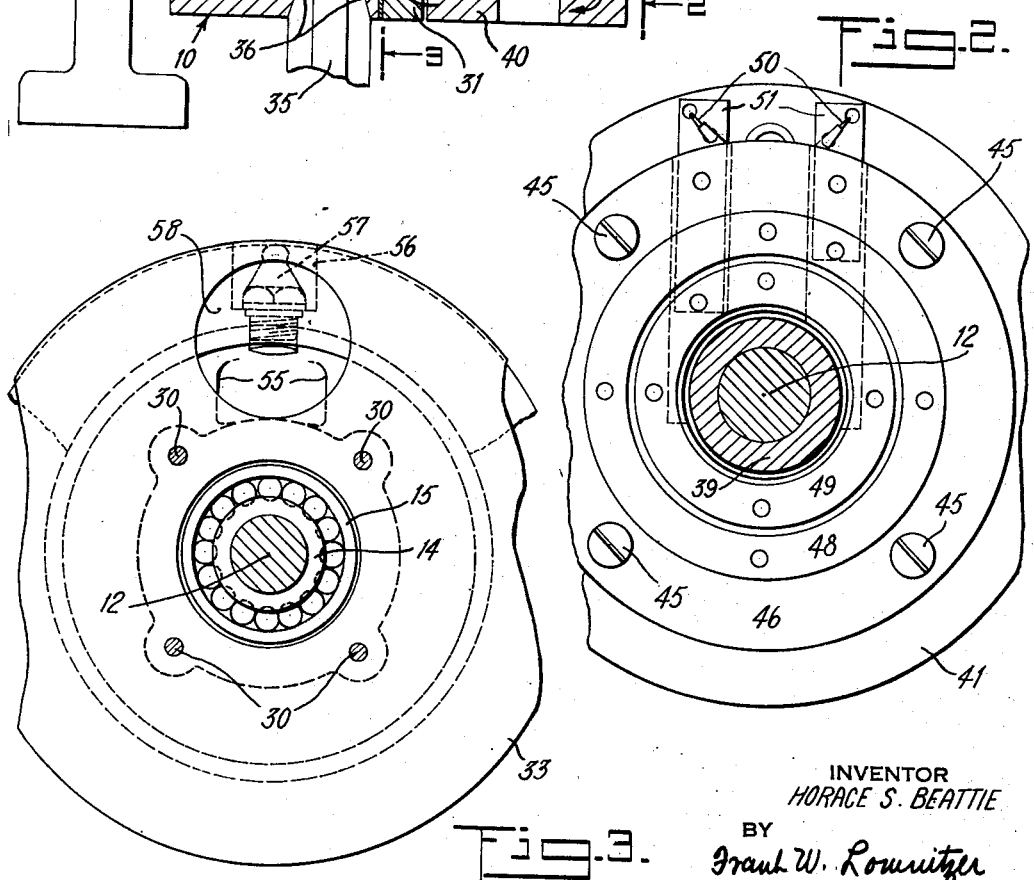
Fig.2.
Fig.3.
INVENTOR
HORACE S. BEATTIE
BY
Frank W. Lowmitzer
ATTORNEY Patented Sept. 8, 1953

2,651,396

UNITED STATES PATENT OFFICE 2,651,396

ELECTROMAGNETIC CLUTCH WITH LUBRICATING MEANS

Horace S. Beattie, Poughkeepsie, N. Y., assignor to International Business Machines Corporation, New York, N. Y., a corporation of New York Application August 25, 1949, Serial No. 112,255

1 Claim. (Cl. 192—84)

This invention relates to improvements in electromagnetic clutches.

Electromagnetic clutches have, heretofore, been devised in various forms and are principally used for starting purposes as a substitute for an ordinary mechanical clutch. These magnetic clutches usually consist of a clutch member carrying an annular slot within which the magnetic winding is placed. In clutches of this class the magnetic field produced by the winding serves to attract an armature member carried by the other part or member of the clutch forcibly toward the driven part, and the driven part is caused to quickly assume the speed of the driving part, due to the friction produced by the magnetic attraction.

One feature of construction of the present electromagnetic clutch is, according to the present invention, to arrange the belt driven or pulley member to be rotatable and slidable on roller bearings arranged on a shaft and to provide a compression spring within said pulley member so that at one end it acts frictionally against and rotates with the pulley member and at the other end against a ball bearing which is arranged to roll idly over the shaft. By this construction the driving member with its compression spring is continually rotatable without creating any frictional resistance and said spring acts by its expansion to normally separate the driving member from the driven member until said magnetic coil is energized to engage the clutch.

A still further feature of construction, according to another phase of the invention, is to have the armature disk which is carried by the driving member frictionaly engage the peripheral rim surface of the driven clutch coil housing member to thereby establish, when said magnetic coil is energized, a full and firm frictional contact surface over the complete peripheral surface of the rim against the action of the compression spring.

A still further feature of construction is to establish such frictional driving contact while maintaining clearance between the bobbin carrying the magnetic coil and the armature disk.

Another feature of construction of a still further phase of the invention is to provide a simple and effective lubricating means which includes a grease coated ball which rolls over and deposits the lubricating medium on the peripheral rim as the frictional contact is being established and to have the driving member recessed to provide a grease reservoir which, by centrifugal force, feeds the lubricating medium to a hole in the armature disk in which the ball is fitted, and to have said lubricating medium emerge through an aperture in a gasket to the hole in the disk, which gasket provides the seal between the face of the pulley member and the armature disk secured thereto. Such form of lubricating means has been found to be simple in construction, effective in action, and eliminates any wear of the coacting clutch surfaces and the squeal which is sometimes produced when the clutch is engaged.

Other objects of the invention will be pointed out in the following description and claim and illustrated in the accompanying drawings, which disclose, by way of example, the principle of the invention and the best mode, which has been contemplated, of applying that principle.

In said drawings:

Fig. 1 is a longitudinal sectional view of one form of magnetic clutch embodying the invention.

Fig. 2 is an end view of the clutch taken on the line 2—2 of Fig. 1.

Fig. 3 is a transverse sectional view taken on the line 3—3 of Fig. 1.

The driving member 10 of the clutch constructed according to the present invention comprises a machined circular pulley member 11 which continually and freely revolves about the driven shaft 12 since the pulley member 11 is fitted to revolve over two roller bearings 13 and 14 which are arranged on the shaft 12.

The outer races of the two roller bearings 13 and 14 are fixed to the pulley 11 by armature holding screws 30. It should be noted that each of the two sets of the rollers of the bearings 13 and 14 roll idly in annular grooves in their inner races and inside the circumferential surface of the outer races 15 in order that the pulley 11 may revolve over the shaft 12 idly with little friction and may also enable the pulley 11 together with the outside races 15 to be slidable to the right or left over the rollers.

Next to the roller bearing 13 is a ball bearing 16 which acts as a thrust bearing for a compression spring 25. Assembled next to the ball bearing 16 is a spacer sleeve 18 loosely encircling the shaft 12 and to the left of the sleeve is another ball bearing 19. Ball bearing 19 fits into a fixed frame 20 of the machine and is held in position in said frame 20 by bearing retaining screws, not shown. At the left of ball bearing 20 is a collar 21 which is secured by a pin 22 to the driven shaft 12. It should be noted that the inner race of the bearing 14 bears against a shoulder 23 of the shaft 12 and that the collar 21 keeps the four bearings and the sleeve 18 in an immovable position with respect to each other and in snug relationship against the shoulder 23 of the driven shaft 12, thereby preventing any endwise movement of the bearings. However, the pulley 11 may, with the outer races 15 of bearings 13 and 14, move slightly to the left or right. The pulley 11 is shown in Fig. 1, as having been shifted to the left which separates it from the clutch coil housing 17, in which position the outer race of the roller bearing 13 abuts the outer race of ball bearing 16 to thus function as a stop for the leftward movement of the pulley 11 effected by compression spring means now to be described.

The normal separation between the pulley 11 and the driven member 17 or clutch coil housing is accomplished by a compression coil spring 25 which fits in an annular slot of pulley 11 and bears at its left against the pulley cap plate 26 which is attached to one face of the pulley 11 by a plurality of fastening screws 27. The right end of the compression spring 25 bears against a spring-bearing plate 28 which fits loosely over the outer race of the ball bearing 16, and which spring-bearing plate in turn bears against a fixed snap ring plate 29 fitting in a circular groove in the outer race of ball bearing 16. Since the ball bearing 16 is immovable on shaft 12 it is obvious that the compression spring 25 bearing against cap plate 26 will maintain the pulley 11 to the left, thus normally separating it from the driven member 17 of the clutch. The spring 25 will rotate with the pulley 11 but freely over the shaft 12 because of its bearing or thrust against the ball bearing 16.

Attached to the pulley 11 by means of a plurality of screws 30 is an armature disk 31 which may be of the same diameter as the outer diameter of the pulley. Between the armature disk 31 and the roller bearing 14 is an annular clearance space 32 and is provided to permit the outer races 15, pulley 11, and armature disk 31 to move as a unit axially of the shaft 12 and with respect to the inner races of bearings 13 and 14. A gasket 33 effects a seal between the surface of the pulley 11 and coacting surface of the disk 31, except as will be noted hereinafter. This gasket 33 functions to prevent grease contained in the reservoir of the pulley 11 from escaping, except to a lubricant depositing means to be subsequently explained.

It was previously stated that pulley 11 is continually revolving and to this end it may be driven by any continually operating member and is preferably driven by means of a belt 35 fitting in a pulley groove 36 in the outer periphery of the pulley 11. The lateral movement of the pulley for the clutch connection is so slight as not to affect the drive by the belt 35 and there will be no tendency for the belt to climb out of the pulley groove 36.

The idling clutch coil housing 17 is machined to form an annular slot 38 which is defined by a hub section 39, an annular outer rim 40 and connecting plate 41. It will be seen that in said annular slot 38 there is inserted a magnetic coil winding 42 carried by a bobbin 43 of insulating material which is similar to a spool which carries thread. A plurality of screws 45 pass through a commutator assembly plate 46 into the bobbin to securely hold the bobbin in the recess 38 of the clutch coil housing and also to hold the commutator assembly plate 46 in a fixed position. The clutch coil housing assembly is secured to the driven shaft 12 by a pin 47. The hub section 39 of the bobbin is arranged by dimensions to be inside of the limits of the outer rim 40 of the housing to prevent the armature disk 31 from striking the hub section 39.

The commutator plate 46 carries insulatably mounted from each other an outer commutator ring plate 48 and an inner commutator ring plate 49. The wire terminals of the coil are identified by reference character 50 and by means of connecting plates 51 each wire terminal of the coil is connected to the respective inner or outer commutator ring plates 48 and 49. Of course, the commutator assembly plate 46 is fully insulated from the clutch coil housing 17 and also from the commutator ring plates 48 and 49 which, in turn, are insulated from each other. This is also true of the connecting plates 51 so that as a result of this assembly the terminals of the magnetic coil are at the commutator ring plates 48 and 49. Contact is made to the commutator ring plates, and thus to the magnet coil 42, by carbon brushes (not shown) which continually bear against the commutator ring plates 48 and 49. By means of an outside circuit control the energizing circuit may be completed to the magnet coil 42 through the commutator ring assembly regardless of the position of the idling clutch coil housing. When this circuit is completed the magnet coil 42 is energized so that the hub section 39, as well as the rim or pole piece 40 being magnetized, will attract the armature disk 31, moving the pulley assembly 10 to the right so that the armature disk 31 will bear hard against the peripheral surface of the pole piece 40. When the armature disk 31 is hard against the pole piece 40 there is still a clearness 52 between the hub section 39 which keeps a steady pull on the armature disk 31 forcibly against the pole piece 40. Thus, when the magnet coil is energized the idling clutch armature disk 31 is attracted to the core of the magnet and frictional contact by the armature disk 31 is made only at the outside rim or pole piece 40 of the idling clutch housing but for the full circumference of the outer rim or pole piece 40. The magnetic force is sufficient to hold the armature disk 31 rigidly against the pole piece 40 and not have slippage after full contact has been made.

Movement of the pulley housing 10 to the right compresses the spring 25 but the magnetic effect of the clutch coil 42 is great enough to overcome the expansive effect of the compression spring 25 so that the clutch pulley is forcibly drawn against the idling clutch coil housing, as just described, in spite of the spring 25 and thus rotate shaft 12 as long as the magnet coil 42 is energized. When the coil is deenergized hub section 39, pole piece 40 and armature disk 31 will now be demagnetized, enabling the expansive force of the spring 25 to return the clutch pulley to its normal disengaged position.

While the above described construction is effective and efficient for the purposes, it is desirable to provide some form of lubrication between the armature disk 31 and the rim 40 to prevent surface wear and especially to prevent a squealing noise when the armature disk 31 moves against or rubs upon the rim 40. A preferred form of lubricating means will now be described.

The pulley 11 is formed with an annular slot or recess 55 which provides a grease reservoir into which a suitable lubricant is inserted. The recess 55 communicates with an opening 56 in which a pressure grease fitting 57 is provided. By the application of a grease gun to said fitting 57 grease is injected in the reservoir 55. Gasket 33 is a seal between the reservoir 55 and the clutch armature disk 31 but said gasket is provided with a circular hole 58 (see Fig. 3), the diameter of which is equal to the distance from the inner edge of the grease reservoir 55 to the outer edge of a hole 59 formed in the clutch disk armature 31. There is inserted in hole 59 two balls 60 which are held in position by the pulley surface not sealed by gasket 33 on one side and the rim 40 of the coil housing on the other side. It is obvious, therefore, that the circular hole 58 is a communicating port between the grease reservoir 55 and the hole 59. The gasket 33 otherwise provides an effective seal so that the lubricant can only flow by centrifugal force out of the reservoir 55 to the balls 60. The grease applied to the left ball 60 causes the right ball to project out of the hole 59 against the outer rim 40 of the idling clutch coil housing. The revolving of the pulley also causes the steel balls to revolve when the right ball 60 is in contact with the rim 40 of the coil housing and this in turn deposits grease on the outer rim. The constant and uniform lubrication of the coacting two surfaces prevents a squealing noise when they approach each other for engaging the clutch and also prevents wear of the frictional contacting surfaces. Although the contacting surfaces are lubricated the magnetic force of attraction between the pole piece 40, hub section 49 and the armature clutch disk 31 is sufficiently strong to cause the pulley to be so firmly in contact with the clutch housing that both units will rotate as one. This in turn causes the pulley drive shaft 12 to turn with the pulley 11 until the magnet coil 42 is deenergized, at which time there will be a relative separation of the clutch elements and the pulley will now revolve idly with respect to shaft 12.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

What is claimed is:

An electromagnetic clutch comprising a continually driven armature member having a lubricating medium carrying reservoir, an armature disk carried by said armature member, a field member provided with an outer rim engageable with said armature disk upon a relative clutch engaging movement of one of said members, said rim registering with a lubricating hole located at the periphery of the armature disk in such position as to receive the lubricating medium projected therein by centrifugal force, a sealing gasket, means for securing said armature disk to said armature member with said sealing gasket between said armature disk and said armature member and in such position that an aperture in said gasket forms a lubricating passage between said reservoir and said lubricating hole, and at least one freely rotatable member in said lubricating hole receiving said lubricating medium thrown by centrifugal force from said reservoir through said aperture and lubricating hole during the rotation of said armature member for depositing the lubricating medium over said rim as the latter is engaged by said armature disk upon the relative clutch connecting movement of said members.

HORACE S. BEATTIE.

References Cited in the file of this patent

UNITED STATES PATENTS

| Number | Name | Date |
|---|---|---|
| 535,738 | Smith | Mar. 12, 1895 |
| 686,960 | Truitt | Nov. 19, 1901 |
| 1,092,015 | Bryant | Mar. 31, 1914 |
| 1,139,005 | Whitcomb | May 11, 1915 |
| 1,169,937 | Dikeman | Feb. 1, 1916 |
| 1,268,777 | Willis | June 4, 1918 |
| 1,529,191 | Kettering | Mar. 10, 1925 |
| 1,800,879 | Tessky | Apr. 14, 1931 |
| 1,814,891 | Bing | July 14, 1931 |
| 2,288,274 | Ewaldson | June 30, 1942 |
| 2,430,174 | Hoover | Nov. 4, 1947 |
| 2,481,028 | Lear | Sept. 6, 1949 |
| 2,528,316 | Mayo | Oct. 31, 1950 |

FOREIGN PATENTS

| Number | Country | Date |
|---|---|---|
| 124,618 | Great Britain | Apr. 3, 1919 |